(12) United States Patent
Gao (10) Patent No.: US 12,372,604 B2
(45) Date of Patent: Jul. 29, 2025

(54) RADIO PERFORMANCE FINGERPRINT BASED SENSOR MANAGEMENT

(71) Applicant: Building Robotics, Inc., Oakland, CA (US)

(72) Inventor: Jun Gao, Saratoga, CA (US)

(73) Assignee: Building Robotics, Inc., Santa Clara, CA (US)

( * ) Notice: Subject to any disclaimer, the term of this patent is extended or adjusted under 35 U.S.C. 154(b) by 532 days.

(21) Appl. No.: 17/822,572

(22) Filed: Aug. 26, 2022

(65) Prior Publication Data

US 2024/0069144 A1    Feb. 29, 2024

(51) Int. Cl.
*G01S 5/02* (2010.01)

(52) U.S. Cl.
CPC ...... *G01S 5/02521* (2020.05); *G01S 5/02529* (2020.05); *G01S 5/0269* (2020.05)

(58) Field of Classification Search
None
See application file for complete search history.

(56) References Cited

U.S. PATENT DOCUMENTS

| | | |
|---|---|---|
| 10,791,425 B2 | 9/2020 | Keal et al. |
| 11,162,848 B2 | 11/2021 | Gao et al. |
| 2019/0239025 A1 | 8/2019 | Keal |
| 2021/0239877 A1 | 8/2021 | Gao et al. |
| 2021/0274460 A1* | 9/2021 | Chen ............... G06F 16/906 |
| 2021/0364298 A1 | 11/2021 | Gao |
| 2023/0358846 A1* | 11/2023 | Golestanian .......... H04W 4/029 |
| 2023/0362588 A1* | 11/2023 | Golestanian ............ H04W 4/33 |

OTHER PUBLICATIONS

U.S. Appl. No. 17/184,334, filed Feb. 24, 2021.

* cited by examiner

*Primary Examiner* — Adolf Dsouza (57) ABSTRACT

A system includes diagnostic circuitry and a zone with one or more associated transceiver nodes. A first transceiver node broadcasts one or more beacons which a second transceiver node attempts to receive. The first transceiver node the second transceiver node or both being associated with the zone. The second transceiver node provides a reception indication to the diagnostic circuitry. Based on the reception indication, the diagnostic circuitry may generate a zone-specific radio signal fingerprint and apply the fingerprint to an input of a performance classification routine. Based on the output of the performance classification routine, the diagnostic circuitry may determine whether the zone-specific radio signal fingerprint for the zone has changed relative to one or more previous zone-specific radio signal fingerprints for the zone.

20 Claims, 6 Drawing Sheets

RADIO PERFORMANCE FINGERPRINT BASED SENSOR MANAGEMENT

TECHNICAL FIELD

This disclosure relates to sensor management.

BACKGROUND

Building management systems encompass a wide variety of equipment that aid in monitoring and controlling building operations. Building management systems often include one or more environmental control sub-systems, such as security, fire safety, lighting, heating, ventilation, and air conditioning ("HVAC") systems. The systems may also provide non-environmental control features for management and occupants of a building, such as indoor location tracking of assets (including occupants). Building management systems may use sensor data to support their operations.

Sensor management systems may include sensors positioned throughout a structure to detect building activity, such as occupancy detection and asset tracking. Unfortunately, these sensors might be installed improperly, recorded inaccurately, or otherwise fail to operate according to specifications. For example, a technician may install a sensor improperly, interchange the locations of two or more sensors, or mislabel a floor or ceiling plan intended to reflect sensor locations. Sensor performance may also change over time and deviate from the condition at installation. Technologies that assist in the identification of incorrect positioning, installation, and/or operation will continue to drive adoption of sensor management systems including those used to support building management operations.

DETAILED DESCRIPTION

A sensor management system of a structure, such as a building, may have devices positioned throughout the structure. Each device may be assigned to a designated location of the structure and include a radio frequency (RF) transceiver node, which may operate as an RF sensor. The transceiver nodes may communicate with each other and measure radio signal path loss from one sensor to another. Expected RF signal values between sensors are determined based on known distances between the sensors or other methods of calculating predetermined RF signal values. Measured RF signal values between sensors are determined based on RF signals transmitted from one sensor to another. Radio signal path loss is determined by a sensor or upstream device based on the difference between the measured RF signal value and the expected RF signal value. When the measured RF signal value does not match the expected RF signal value, the corresponding sensor(s) may be marked as having undergone a radio performance change.

Radio signals suffer attenuation when they travel from a transmitter to a receiver in a somewhat unpredictable way, resulting in radio signal path loss. The path loss reduces the power density of an electromagnetic wave as it propagates through an environment. The path loss may occur as a result of traveling through free space, atmospheric conditions, and intermediate objects and reflecting from surrounding objects. For example, in free space, signals diminish in intensity as they propagate away from the transmitter. A structure such as a building environment, walls, furniture, equipment, people, and other obstructions may reflect or absorb, or both reflect and absorb, the radio signals. When a group of sensors is installed in a specific environment, the sensor management system will measure all the sensors' radio signal path losses and address any issues derived from these measurements.

The radio signal path loss is a random signal. Therefore, for some implementations, a training-based machine learning approach and/or a trend-identifying analytic approach may be used to produce a robust characteristic of the path loss that is not transient and reflects structural and/or semi-permanent environmental factors. Multiple signals (e.g., beacons) may be transmitted from a transceiver node in a session (for example, a burst transmission session). A group of zone-associated receiving nodes may or may not detect or receive all the signals transmitted. However, a percentage of the transmitted signals may be captured. The reports from the receiving nodes may be used to generate an identifiable fingerprint. The features of the fingerprint are determined by the structural and semi-permanent environmental factors and by the operational condition of the nodes. Acute intermittent path-loss effects may be averaged out over the beacon transmission session and across nodes—similar to the effect seen from multiple frames of a grainy film (e.g., the picture from the rolling frames appears clearer than that of any individual frame). Nevertheless, even a single beacon session may result in a fingerprint identifiably similar to previous fingerprints depending on the number of receiving nodes and/or other distinguishing factors. Thus, if a fingerprint of a zone changes, the change may be attributable to changes in structural and semi-permanent environmental factors and/or the operational condition of the nodes.

In various implementations, a network of transceiver nodes may be divided into zones. The zone may include a defined area within a building or structure which may be logically and/or physically partitioned from other zones. In various implementations, zones may correspond to the area units used for location service reporting. For example, when the network reports the location of a device relying on the network for location services, the network may respond by identifying which zone the device is located in. Transceiver nodes within a particular zone may receive radio signals from and/or send radio signals to other nodes within with the radio signaling range of the nodes. Accordingly, causing a first node associated with the zone to generate a beacon may result in other nodes receiving at least of portion of the transmitted power of the one or more beacons. Because the portion received by the individual nodes may vary from node-to-node depending, at least in part, on non-transient portions of the path loss, the group of received portions may be an identifiable collection of different power levels, received numbers of beacons, and/or other quantifiable measures of the received beacons. The collective received beacon data may provide a zone-specific radio signal fingerprint (ZRSF) for that zone when the collective received beacon data is filtered to exclude information unrelated to nodes within the zone. In other words, the ZRSF may include beacon data for nodes in the zone and exclude beacon data for nodes outside the zone. That ZRSF may be compared to one or more previous ZRSFs for that same zone, e.g., via a machine-learning and/or analytic classification algorithm, to determine whether the ZRSF for the zone has changed. If a change in the ZRSF for a zone is detected, a change indication may be generated to trigger additional investigation/analysis, network service, record updates, and/or other responsive actions.

Figure 1:
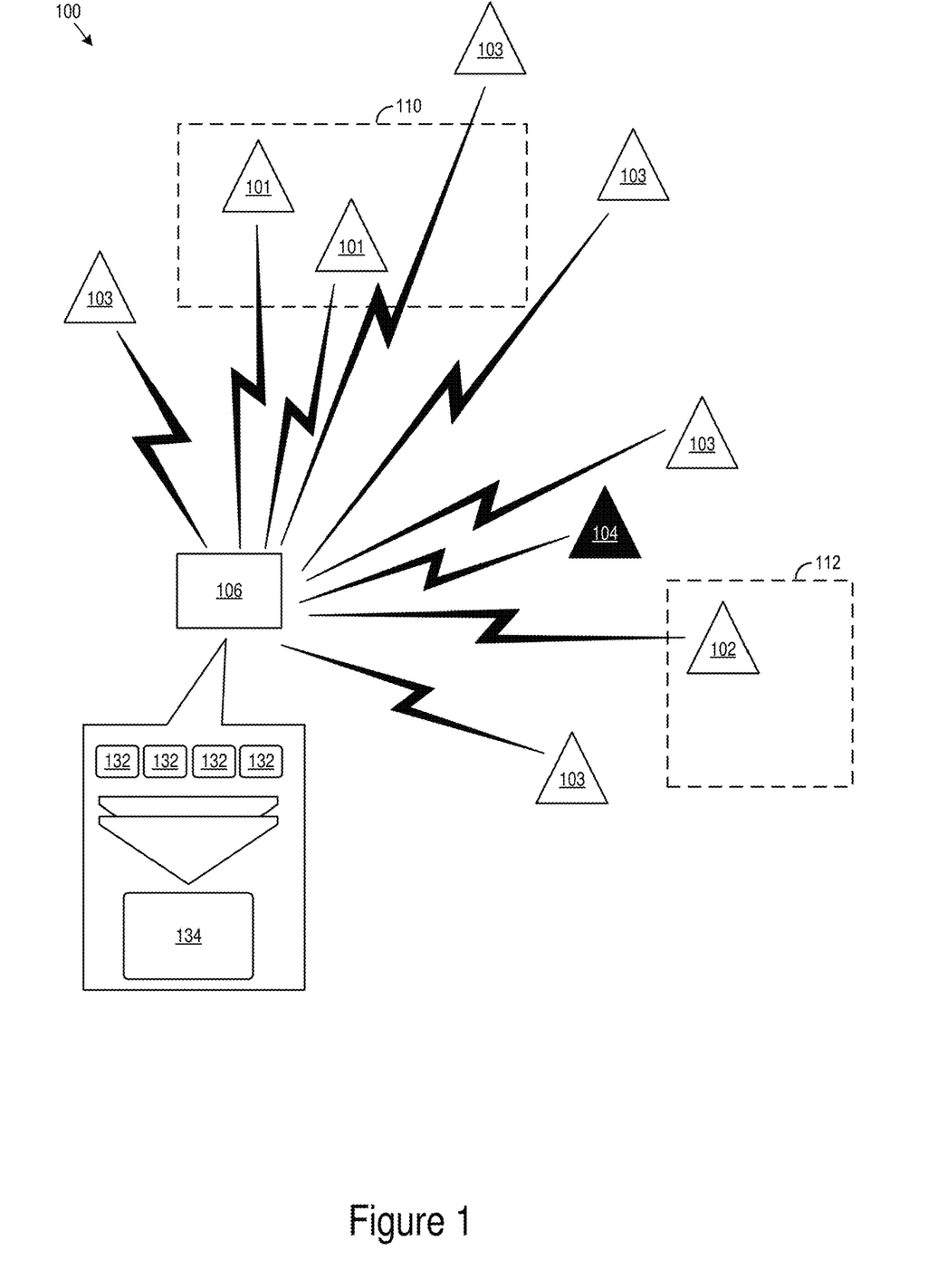
FIG. 1 shows an example sensor network including multiple transceiver nodes.

FIG. 1 shows an example sensor system 100 including multiple transceiver nodes 102, 104. The multiple transceiver nodes 101, 102, 103, 104 may each include an RF transceiver for broadcast and/or reception of RF signals. The sensor system 100 may further include diagnostic circuitry 106 which may coordinate RF signaling among the multiple transceiver nodes 101, 102, 103, 104 to perform self-diagnostic evaluation of the radio performance status of the system 100. In some cases, the diagnostic circuitry 106 may be integrated with and/or share hardware with other coordination circuitry to control/coordinate other non-diagnostic functionality. The diagnostic circuitry 106 may be included or integrated with one or more of the transceiver nodes 101, 102, 103, 104.

The diagnostic circuitry 106 may be localized to the coverage area of the sensor system 100 or partially/fully remote. The diagnostic circuitry 106 may operate on distributed hardware (such as cloud based systems and/or various other network based systems) or centralized hardware such a remote server or on-site computer system.

In various implementations, the multiple transceiver nodes 101, 102, 103, 104 may include sensors for a real-time location system (RTLS), which may provide location services for RF devices (such as RTLS-enabled ID badges, mobile devices, and/or other devices) within building or other structure and/or any zone covered by the multiple transceiver nodes 101, 102, 103, 104 of the sensor system 100. The multiple transceiver nodes 101, 102, 103, 104 may further include signal processing circuitry to support localized processing/analysis of signals (for example, physical layer signal processing in a multi-layer communications stack) and/or other signal processing.

The multiple transceiver nodes 101, 102, 103, 104 may further include system circuitry (such as memory and/or processors) to coordinate operation of the transceiver nodes. The computational capacity of the system circuitry may vary across various implementations. For example, some implementations may use thin client and/or low-level processing capacity. For example, some implementation may use system circuitry within the multiple transceiver nodes 101, 102, 103, 104 capable of supporting specific transmit and/or receive RF operations but may offload various other processing tasks to other processing devices in the sensor system 100. In some implementations, the transceiver nodes 101, 102, 103, 104 may include processing to support various tasks beyond physical signal processing, such as various user interface based applications. In some implementations, non-uniform transceiver nodes may be used. For example, a portion of the transceiver nodes 101, 102, 103, 104 may include thin processing capabilities while other transceiver nodes 101, 102, 103, 104 the same system may include more expansive processing capabilities. In some cases, the transceiver nodes 101, 102, 103, 104 may be organized such that local 'control' nodes may coordinate activities of a contingent of thin nodes.

Figure 2:
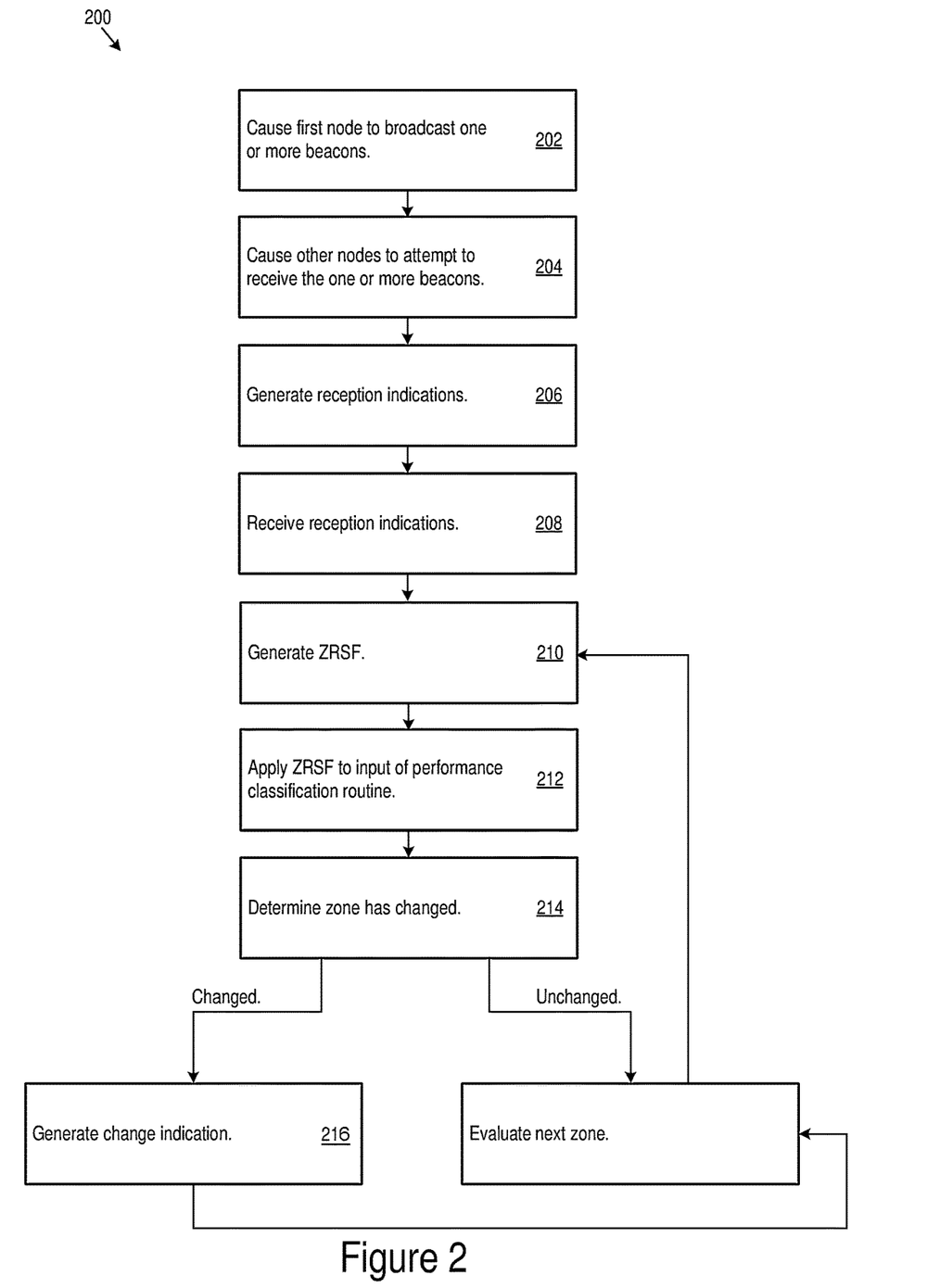
FIG. 2 shows example diagnostic logic.

Referring now to FIG. 2 while continuing to refer to FIG. 1, example diagnostic logic 200 is shown. The diagnostic logic 200 may be implemented using the diagnostic circuitry 106.

The diagnostic logic 200 may cause a first transceiver node 104 to broadcast one or more beacons (202). In the example system 100, each node may be associated with a zone. For example a first-zone nodes 101 may be associated with a first zone 110, while second-zone nodes 102 may be associated with a second zone. Although not shown, nodes may be associated with multiple zones. Other nodes 103, 104 may be associated with various other zones, which are not shown.

In some cases, the process of transmitting and receiving beacons for the diagnostic process may correspond to a diagnostic mode of operation for the nodes. In some cases, such diagnostic modes may be run as background processes, while nominal functions, such as RTLS services, lighting control, building management, environmental control, and/or other services continue to be provided by the node. In some cases, the operation of the node in a diagnostic mode may result in foreground operation. For example, the node may pause provision of nominal functions while in the diagnostic mode.

In some implementations, zones may include delimited boundaries in physical space. Various schemes may be used to select nodes for association with zones. For example, boundaries may be determined based on a floorplan and nodes marked on the floorplan as being within the boundaries may be associated with the zone. For example, an installation technician and/or other operator may assign nodes manually to zone (e.g., based on customer preferences for when different locations within the network should be reported as different).

The first (beaconing) node 104 is highlighted in black for clarity of presentation but may include a node with functionality the same or similar to that of other nodes 101, 102, 103. As discussed below, each of the other nodes 101, 102, 103 at different points in the diagnosis may serve as a beaconing node. In various implementations, the beacons may have one or more predetermined target properties. For example, the beacons may be transmitted at a specific target band, at predetermined target power level(s), in a sequence of a specific length, in a sequence with a predetermined target total power, in sequence with a predetermined target number of beacons, or with other predetermined target characteristics. In some cases, the one or more target properties of each individual beacon maybe the same as that of the other beacons in the sequence. Thus, in some cases, the beacons transmitted may be uniform in target power, target band, and/or other properties.

In some implementations, the beacons may have one or more random, pseudorandom, and/or otherwise non-deterministic target properties. The first transceiver node 104 may report (e.g., to the diagnostic logic 200) the target properties for comparison with the actually received beacons. Additionally or alternatively, beacon target property reporting may be used with systems with deterministic target properties. Reporting may be used to confirm that nodes are executing proper and/or expected operations during beaconing (e.g., whether or not the target properties are known or knowable by the diagnostic logic prior to reception of the report). In various contexts, reporting target properties may increase the bandwidth used by the nodes for reporting relative to systems that do not use such reports (e.g., systems that use predetermined target properties in lieu of reliance on target property reporting). In both cases, indications of the actual received beacon properties may be used. Accordingly, non-use of target property reports may allow for implementations with less overall bandwidth capability that those that use such reports. Systems that provide such reports may have increased data to support more complete analysis and may more quickly identify transmission-side radio performance issues due the presence of both transmission side and reception side reports.

In some implementations where beacon properties may change from beacon to beacon, reception indications 132 may include increased data detail. For example, counts and power-sums of beacons may have reduced informational value where beacon properties change. Accordingly, such increased data detail may include additional received power level reports. For example, a receiving node 101, 102, 103 may report individual beacon RSSIs in addition to or in lieu of summed power (or squared power) levels. In some cases, power levels for a selected subset of beacons in a series may be provided. For example, for beacons that change in a set progression (e.g., increasing/decreasing power by a set increment, or other progression) a sample (e.g., every X beacons, where X is an integer) may provide similar information to a report with detail on every beacon. In some cases, such sampling may be paired with summation information to provide information on all received beacons while also providing detail on a selected subset.

In some implementations, the first transceiver node 104 may broadcast a node identifier along with the beacons and/or embedded within the beacons to allow the other nodes 101, 102, 103 and/or diagnostic circuitry 106 to identify the first transceiver node 104 as the origin of the beacons. Additionally or alternatively, the diagnostic logic 200 may track which node 104 is broadcasting beacons and associate received reception indications 132 (see below) according to timestamps or other time indicators within the reception indications 132. In some cases, a broadcast schedule may be distributed to the nodes. Using the schedule, nodes and/or the diagnostic logic 200 may determine the identity of the first node 104 that is currently broadcasting beacons.

Coordinated with the first transceiver node broadcast, the diagnostic logic 200 may cause other transceiver nodes 101, 102, 103 attempt to receive the one or more beacons (204). In some cases, the diagnostic logic 200 may place the other transceiver nodes 101, 102, 103 in a listening state to facilitate reception of the beacons. For example, the other nodes 101, 102, 103 may cease transmissions while the first transceiver node broadcasts. This may, for example, reduce interference and/or m is-attributed received power (e.g., when other nodes are allowed to transmit, a receiving node may improperly attribute received power to the first broadcasting node).

In various implementations, the listening state may include tuning a radio antenna to a predetermined testing band and/or tuning to a sequence of bands predetermined intervals. In some cases, entering a listening state may include implementing diagnostic firmware and/or a diagnostic functionality of firmware on the various transceiver nodes. In some cases, for example in some cases where thin nodes are used, the transceiver nodes may include memory storage to support firmware capable of a limited number of functions. Accordingly, to execute the listen state and/or beacon broadcast, specific diagnostic firmware may be loaded onto the transceiver nodes 101, 102, 103, 104 and then replaced with nominal operation firmware when the diagnosis procedure is complete.

In some implementations, a node background process may be used for beacon transmission and/or reception. For example, the nodes may continue nominal operation while performing beacon transmission on a pre-determined diagnostic RF channel (e.g., which may be a shared physical channel, a dedicated physical channel, and/or a set of static or non-static time-frequency block allocations).

The other nodes 101, 102, 103 may generate reception indications 132 based on the respective portions of the beacons they receive from the first transceiver node 104 (206). The reception indications 132 may include various data regarding the characteristics (such as total power, sum of the squares individual received beacon powers, and/or other characteristics) and/or number of beacons received by each individual one of the other nodes 101, 102, 103.

In some cases, the reported characteristics may use metrics or other signal characterization tools used for various other functionality of the transceiver nodes. For example, cellular-compliant, WIFI-compliant, RTLS-compliant, Bluetooth-compliant, and/or other radio communications standards may collect various signal parameters. As an example, a received signal strength indicator (RSSI) may be used in various ones of such standards. In some cases, the other nodes 104 may report a RSSI as a measure of received beacon power in the reception indications 132. In some cases, various sums or other functions of the RSSI may be reported. For example, a count of RSSIs generated during beacon reception may be reported as a count of the beacons received. For example, the sum of the RSSIs during beaconing may be reported as a total received power. For example, a sum of the squares of the RSSIs may be reported as a sum of squares of the powers of the beacons.

In various implementations, the reception indication 132 may identify the node that generated the indication, the identity of the first node 104 that broadcast the beacons (if known by the receiving node), and/or the time (e.g., using timestamps and/or other time indicators) at which the beacons were received.

The number and characteristics of the received beacons at each of the other nodes 101, 102, 103 may be affected by the actual characteristics of the beacons transmitted by the first node 104 the RF path from the first node 104 to that particular one other nodes, and the condition of that particular one other nodes. Thus, the reception indication 132 may contain information on the transmitting node, the receiving node, and the path between those two particular nodes. The match and/or mismatch between the actual received power/number of beacons and the target properties of the transmitted beacons may be used to determine such information on transmitting node, the receiving node, and the path between those two particular nodes.

In various implementations, after the first node 104 completes the broadcast of the beacons, the first node 104 may shift to attempting beacon reception and one of the other nodes 101, 102, 103 may take over as the first transmitting node. In various implementations, the process may iterate until each node has completed one or more turns broadcasting beacons. Thus, although a particular node is shown as the first transceiver node 104 for the purpose of illustration, each (or some) of the other nodes 101, 102, 103 may have a turn acting as the first transceiver node 104. In some implementations, only a sub-set of other nodes 101, 102, 103 may be used as first transceiver nodes 104 in other implementations. In some implementations, a particular first node may be the only node used as a transmitting node for the diagnostic process.

Additionally or alternatively to the node association schemes discussed above, the zone 110, 112 node associations may be selected based on node proximity, node transmission/reception range, RF path characteristics, and/or environmental characteristics. For example, a zone may include the transceiver nodes in a particular room, and/or those of any designated portion of a structure or region. Although not shown, a particular node may be associated with multiple zones.

In some implementations, the nodes 101, 102, 103, 104 may be divided into diagnostic groups to control the length of the diagnostic process. In some cases, the diagnostic process may take longer with greater numbers of nodes. Accordingly, nodes may be divided into diagnostic groups (e.g., with no or minimal inter-group interference, for example nodes on different floors of a building may be place into different diagnostic groups) for the purpose of shortening the amount of time used to perform the diagnostic. In some cases, nodes may be included in multiple different diagnostic groups. Accordingly, different diagnostic groups may be overlapping or non-overlapping.

After generation of the reception indications 132, the other nodes 103, 104 may send (e.g., via RF network communications, backhaul network communications, and/or other network communications) the reception indications 132 to the diagnostic circuitry 106 (208). In some cases, nodes may operate as data relays for other nodes. For example, some individual nodes may be installed without direct backhaul network access. For example, nodes may pass reporting data to other nodes via peer-to-peer wireless communications. Once the peer-to-peer wireless communications reach a node and/or other terminal with backhaul network access, the connected node may transfer the reporting information onto the backhaul network.

In some cases, a particular node 101, 102, 103, 104 may be installed as a "relay" node. Relay nodes may be positioned within a system to support inter-node communications such as peer-to-peer wireless communications. In some cases, a relay node may be positioned in a location that is redundant for one or more operational purposes of the nodes. For example, the location may have RTLS, and/or other wireless service coverage from other close-by nodes. The relay node may provide capability to the node network by supporting communication to isolated nodes or areas rather than providing non-redundant support for other operational purposes of the nodes. Additionally or alternatively, nodes may be positioned to support wireless signal repetition and/or wireless transmission extension.

The diagnostic circuitry 106 may obtain the reception indications 132 from the other nodes 101, 102, 103 and generate, based on the reception indications 132, a ZRSF 134 (210). For example, the ZRSF may compile data from the reception indications into a specific data structure and/or format that may serve as the ZRSF 134. For example, the ZRSF 134 may include column and/or tabular data from the reception indications 132. For example, the ZRSF 134 may include knowledge graph representations, e.g., where tuples representing the send node, the receiving node, and the received beacon characteristics are represented in a knowledge graph format. For example, the diagnostic circuitry 106 may generate an image representative of the compiled data.

As discussed above, the ZRSF may include data for nodes 101, 102 associated with the zone 110, 112 (e.g., within the zone). The data may include data on beacons sent by the nodes 101, 102 (e.g., during their respective turns as the beaconing node). Additionally or alternatively, the data may include data on beacons sent by other nodes 103, 104 but captured by the nodes 101, 102 associated with the zone. The data may exclude/filter data that is not based on either a beacon sent by a zone node 101, 102 or a beacon received at a zone node 101, 102.

The diagnostic logic 200 may apply the ZRSF 134 to an input for a performance classification routine (212) to effect comparison between the (current) ZRSF 134 and previous ZRSFs for the zone 120. The performance classification routine may include one or more of various machine-learning and/or analytic classification algorithms. The diagnostic logic 200 may determine whether the ZRSF 134 differs from the previous ZRSFs for the zone using an output of the performance classification routine (214).

In various implementations, the performance classification routine may include a machine-learning algorithm such as a neural network, a support vector machine, a decision tree, a k-nearest neighbor algorithm, and/or other machine-learning classifier. For example, neural network may be implemented using multiple neural network layers including an input layer configured to accept the ZRSF data, one or more hidden layers, and an output layer configured to return a classification (e.g., 'unchanged', 'changed' or other result). The hidden layers may be trained using a data set including the previous ZRSF. In another illustrative example, the support vectors of a kernel function of a support vector machine may be trained such that the kernel function provides a boundary between clusters of ZRSFs that would be classified as 'unchanged' with respect to one another. ZRSFs across the boundary from one another may be classified as 'changed' with respect to one another. For image-type ZRSFs, image specific classification routines may be used. For example, convolutional neural networks, efficient Unets, or other image-specific classification routines may be used.

In various implementations, the performance classification routine may include an analytic algorithm such as a smoothing algorithm and/or a regression algorithm to predict the expected characteristics for the current ZRSF 134 based on the previous ZRSFs (e.g., by mapping trends within the previous ZRSF data). When the current ZRSF 134 deviates (e.g., by a pre-determined threshold) from the predictive trend, the performance classification routine may indicate via its output that the current ZRSF 134 has changed with relative to the previous ZRSFs.

In some cases, the machine-learning training and/or analytic trends may be initialized using floor plan data. For example, expected signal levels and/or signal ranges may be used to provide expected signatures to provide a 'first guess' for the machine learning and/or analytic process. In some cases, training and/or trend algorithms may rely on convergence of an iterative process. In some cases, providing an initial state that may be an approximation of the current state of the system may accelerate the convergence process.

When the current ZRSF 134 differs from previous ZRSFs for the zone 120, the diagnostic logic 200 may generate a change indication for the zone 120 (216). The change indication may include an identifier for the zone 120 to mark the zone for additional service and/or analysis. The message/alert may be transmitted to an operator account for display via a messaging or alert system for on operator responsible for maintenance of the nodes. In some cases, the change indication may include a command for display of the identifiers for the changed zones on a terminal. The indicator may have different formats in different implementations. In various implementations, the format of the change indication may be selected to inform an operator responsible for maintenance of which nodes may require maintenance and/or further performance diagnosis.

In various implementations, the diagnostic logic 200 further identifies specific change cases. For example, a potential change may include the addition of a new transceiver node 101, 102, 103, 104 in a period since a previous ZRSF was captured. The addition of the transceiver node 101, 102, 103, 104 may be identified as a special case by the performance classification routine and classified separately from other identified 'changes'. The diagnostic logic 200 may provide an interface option (e.g., via interfaces 418 discussed below) for an operator to add a record of the transceiver node 101, 102, 103, 104 (e.g., to floorplan data) and/or to confirm that an addition of a transceiver node 101, 102, 103, 104 is the correct explanation of the changed ZRSF 134. In some cases, the diagnostic logic 200 may indicate such specific change cases in the change indication without corresponding interface options to inform the operator of the change without necessarily indicating that additional analysis or service should be performed.

In some cases, the change indication may include a message or an alert including identifiers for the nodes with threshold-exceeding radio performance changes. The message/alert may be transmitted to a user account for display via a messaging or alert system for a user responsible for maintenance of the nodes. In some cases, the change indication may include a command for display of the identifiers for the threshold-exceeding nodes on a terminal. The indicator may have different formats in different implementations. In various implementations, the format of the change indication may be selected to inform a user responsible for maintenance of which nodes may require maintenance and/or further performance diagnosis.

Figure 3:
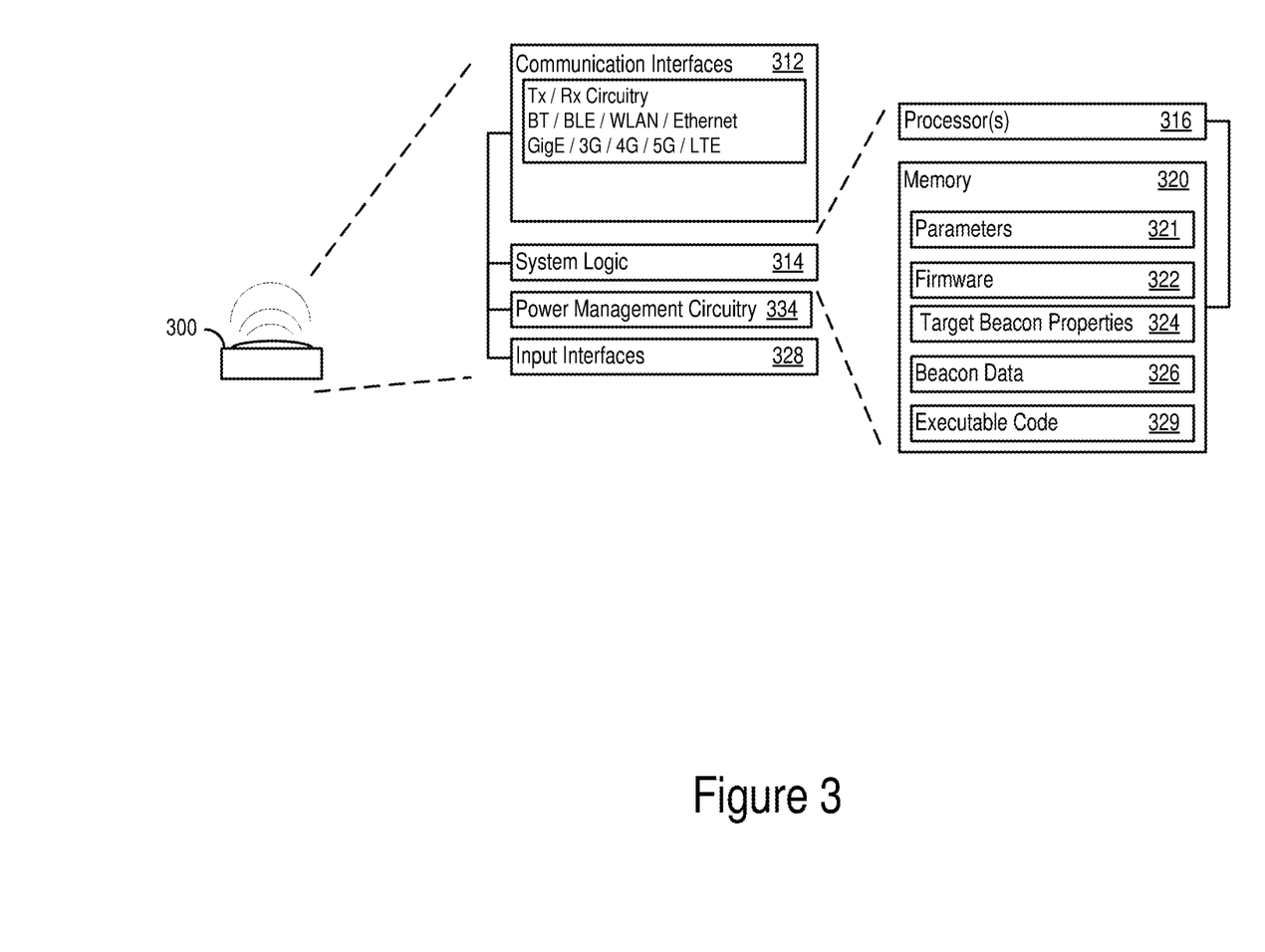
FIG. 3 shows an example transceiver node.

FIG. 3 shows an example transceiver node 300. The transceiver node 300 may include system logic 314 to support functional tasks such as provisional of RTLS services, RF sensor application services, node-to-node communications, node-to-controller communications, firmware management and installation, and/or other functional tasks. The system logic 314 may further support beacon generation and//or beacon reception during diagnostic operation. The system logic 314 may include processors 316, memory 320, and/or other circuitry.

The memory 320 may be used to store firmware 322, target beacon properties 324, and/or received beacon data 326 used in execution of diagnostic operations. The memory 320 may further store parameters 321, such as node identifiers, zone associations, function parameters (such as parameters used in RTLS operation), and/or other data used to support operation of the transceiver node 300). The memory may further store executable code 329, which may support nominal operation, such as RTLS operation, and/or diagnostic operation.

The transceiver node 300 may also include one or more communication interfaces 312, which may support wireless, e.g. Bluetooth, Bluetooth Low Energy, Wi-Fi, WLAN, cellular (3G, 4G, 5G, LTE/A), RTLS signaling, and/or wired, ethernet, Gigabit ethernet, optical networking protocols. Additionally, or alternatively, the communication interface 312 may beacon transmission/reception to support diagnostic operation. The transceiver node 300 may include power management circuitry 334 and one or more input interfaces 328.

Figure 4:
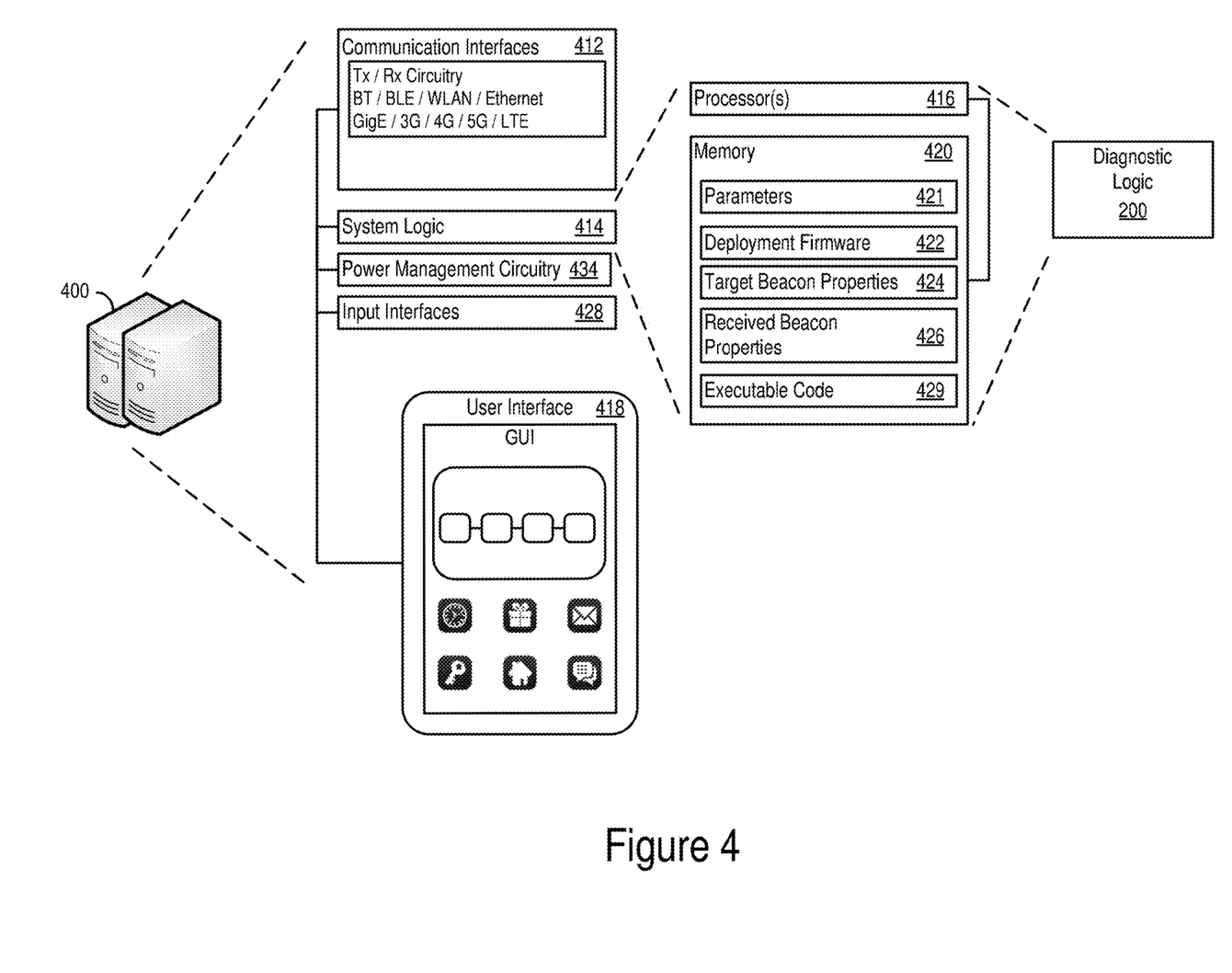
FIG. 4 shows an example diagnostic execution environment.

FIG. 4 shows an example diagnostic execution environment (DEE) 400, which, for example, may operate as diagnostic circuitry 106. The DEE 400 may include system logic 414 to support coordination of beaconing and listening by the transceiver nodes 102, 104, 108. The system logic 414 may include processors 416, memory 420, and/or other circuitry, which may be used to analyze reception indications, determine radio performance changes, determine radio performance distributions among diagnostic groups, determine change thresholds, identify nodes exceeding change thresholds, and/or report change indications.

The memory 420 may be used to store: firmware for deployment to the transceiver nodes 422, target beacon properties 424, and/or received beacon data 426 used in execution of diagnostic operations. The memory 420 may further store parameters 421, such as node identifiers, timings for diagnostic operations, zone associations and/or other coordination parameters. The memory may further store executable code 429, which may support diagnostic operation and/or other maintenance functions.

The DEE 400 may also include one or more communication interfaces 412, which may support wireless, e.g. Bluetooth, Bluetooth Low Energy, Wi-Fi, WLAN, cellular (3G, 4G, 5G, LTE/A), and/or wired, ethernet, Gigabit ethernet, optical networking protocols. The DEE 400 may include power management circuitry 434 and one or more input interfaces 428.

The DEE 400 may also include a user interface 418 that may include man-machine interfaces and/or graphical user interfaces (GUI). The GUI may be used to present options for sensor maintenance, diagnostic operations, and/or other sensor management operations.

Consistent with discussion of the diagnostic circuitry 106 above, the DEE 400 may be implemented as a localized system, in some implementations. In some implementations, the DEE 400 may be implemented as a distributed system. For example, the DEE 400 may be deployed in a cloud computing environment. In some cases, the DEE 400 may be implemented (at least in part) on hardware integrated (and/or co-located) with the example transceiver node 300. Accordingly, in various implementations, functions of the diagnostic logic 200 may be performed by hardware on the transceiver nodes 101, 102, 103, 104 themselves (e.g., in localized at a single node or distributed over multiple nodes).

Figure 5:
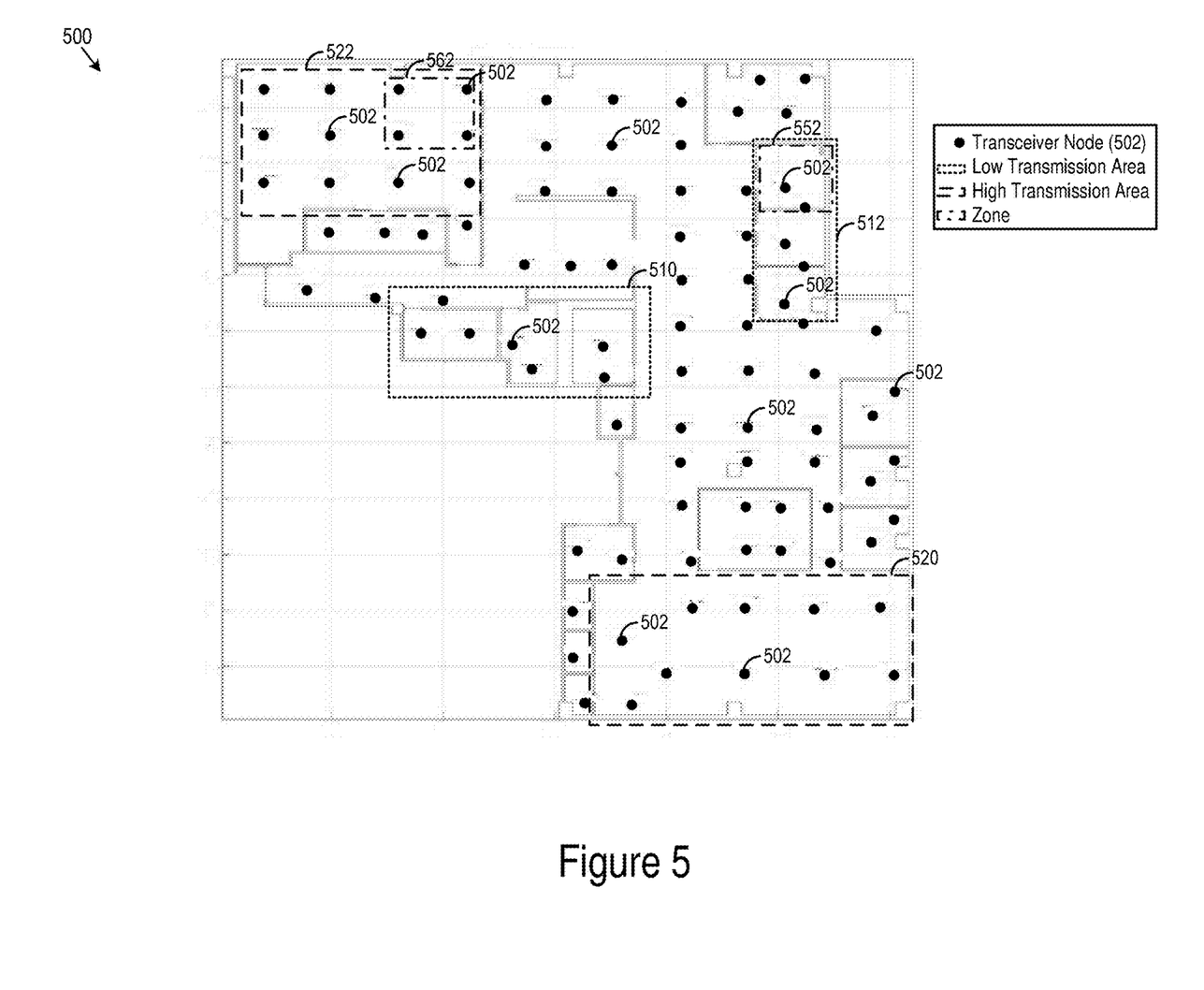
FIG. 5 shows an example sensor floorplan.

FIG. 5 shows an example sensor floor plan 500 with example transceiver node locations 502. The RF paths created by the floor plan creates areas of low node-to-node reception, such as the example bathroom area 510 and the example meeting room area 512. The RF paths created by the floor plan creates areas of high node-to-node reception, such as the example atrium area 520 and the example lecture hall 522.

In an illustrative scenario, the nodes 502 in the meeting room area 512 are part of a first zone 552. The nodes 502 in the lecture hall 522 are part of a second zone 562. Because of the low node-to-node reception for the nodes 502 in the meeting room area 512, the power levels and/or received beacon counts for the ZRSF for the first zone 552 may differ from those of the second zone 562. For example, because node-to-node reception may be intermittent for the first zone 552, a change to a 100% beacon loss level (e.g., at least some of the other nodes receive no beacons from a given node in the zone during the diagnostic process) may not necessarily result in the classification routine determining that a change has occur. However, such a change for a node (or nodes) in the second zone 562 may be indicative of transmitter damage, an environmental change (such as a new wall) that obstructs beacon transmission, and/or other significant change in node conditions.

The inverse scenario may also be illustrative. For a change to a 100% reception level for beacons from a given node at a second node in the first zone 552, the classification routine may determine a change occurred. Such a change may be highly likely to be detected by the classification routine because at least some amount of loss may be expected due to the numerous walls in the meeting room area 512. Thus, a large positive change in reception may indicate the removal or breech of a wall, a node relocation, or other change that improves node-to-node reception. However, in the lecture hall 522, node-to-node reception may be high. Thus, a change to a 100% reception level for beacons may be consistent with previous one or more previous ZRSFs for the second zone 562—reducing the likelihood of a radio change indicator being generated.

Figure 6:
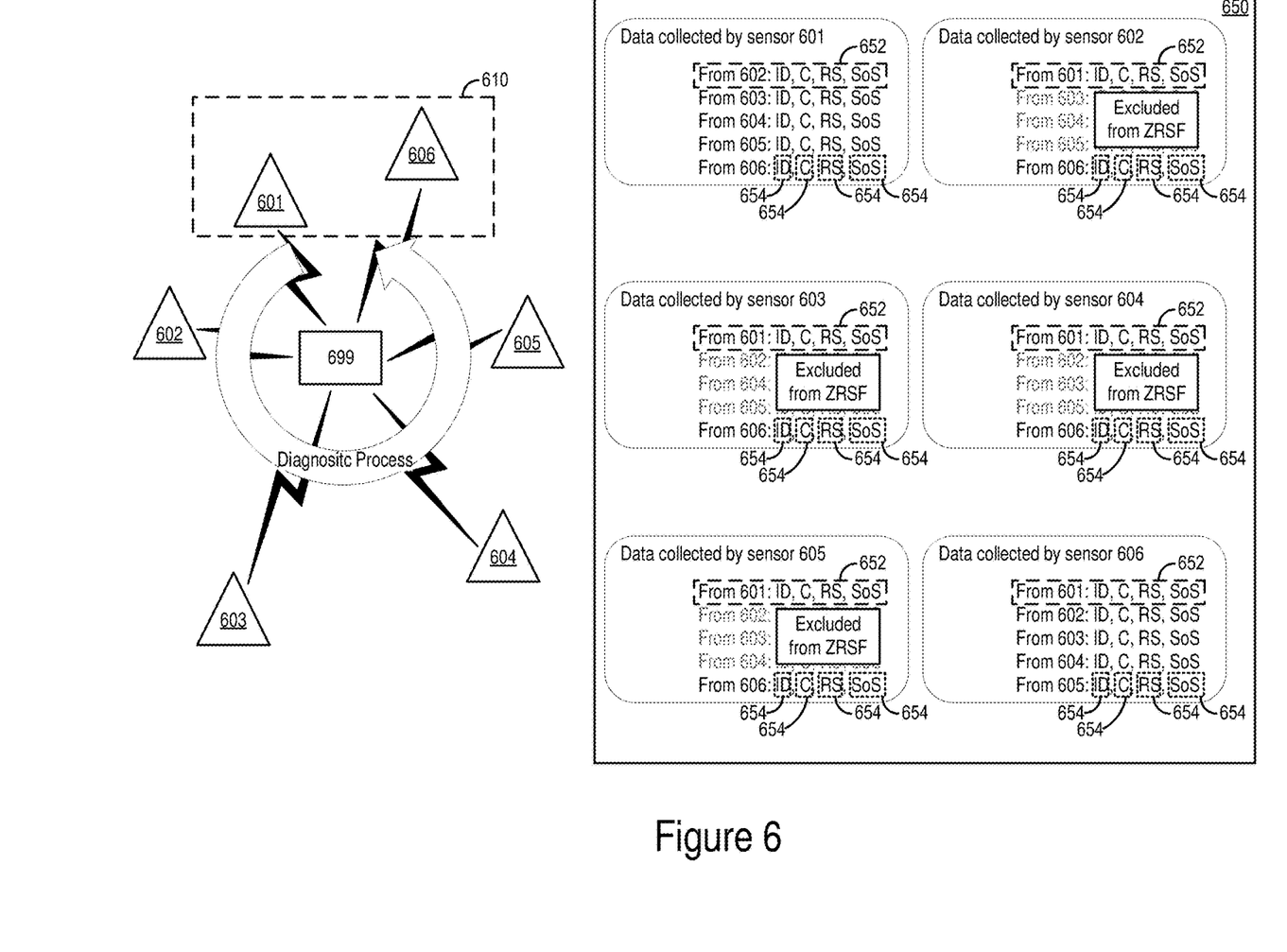
FIG. 6 shows an example zone-specific radio signal fingerprint for an example zone.

FIG. 6 shows an illustrative example ZRSF 650 for an example zone 610. The transceiver nodes 601-606 *e* may perform the diagnostic process with each of the nodes transceiver nodes 601-606 taking a turn as the node transmitting beacons with the other nodes in the group receiving the beacons. In the example, two of the nodes 601, 606 may be associated with a zone 610. In the example, each node reports the identifier (ID) count (C), sum of RSSIs (SR), and sum of squared RSSIs (SoS) for each of the other five beacons in the zone. Accordingly, the example diagnostic circuitry 699 receives 30 tuples 652 each with four values 654. Accordingly, the diagnostic process produces 120 values 654. The 120 values may be filtered by the diagnostic circuitry 699 to obtain the values related to the nodes within the zone of interest. Thus, the diagnostic circuitry 610 obtains 10 tuples reported in the reception indications from the nodes 601, 606 in the zone 610 and two tuples related to the zone nodes 601, 606 from each of the other nodes 602-605. The 18 tuples 652 correspond to 72 underlying values 654 for the ZRSF. The 72 values 654 may provide the classification space in which the classification routine may detect changes in the RF signal paths of the zone 610.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

Table 1 includes various examples.

TABLE 1

| Examples |
|---|
| 1. A system including:<br>a second sensor, the first sensor the second senor or both being associated with a zone, the second sensor configured to:<br>generate a reception indication of a received portion of the one or more beacons;<br>diagnostic circuitry in data communication with the second sensor, the diagnostic circuitry configured to:<br>generate, based on the reception indication a current zone-specific radio signal fingerprint (ZRSF);<br>apply the current ZRSF to an input for a performance classification routine to compare the current ZRSF to a previous ZRSF for the zone;<br>determine, via an output of the performance classification routine, that a current performance classification corresponding to the current ZRSF differs from a previous classification for the zone, the previous classification based at least in part on the previous ZRSF for the zone; and |

TABLE 1-continued

Examples 1. generate, responsive to determining that the current performance classification differs from the previous classification, a performance change indication for the zone, where:
optionally, the system is in accord with any other example in this table.
2. The system of example 1 or any other example in this table, where the performance classification routine includes:
a neural network;
a support vector machine;
a decision tree;
a k-nearest neighbor algorithm; or
any grouping of the foregoing.
3. The system of example 1 or any other example in this table, where the input of the performance classification routine includes an input layer of a neural network.
4. The system of example 1 or any other example in this table, where the diagnostic circuitry is configured to compare the current ZRSF to the previous ZRSF by training the performance classification routine using a dataset including the previous ZRSF prior to application of the current ZRSF to the input.
5. The system of example 4 or any other example in this table, where the diagnostic circuitry is configured to initialize the training of the performance classification routine based on floorplan data for the network.
6. The system of example 5 or any other example in this table, where the diagnostic circuitry is further configured to cause, at a user interface for control the diagnostic circuitry, presentation of an interface option to add a record of a new sensor to the floorplan data for the network responsive to determining that the current ZRSF differs from the previous classification for the zone.
7. The system of example 1 or any other example in this table, where the current ZRSF includes:
a received signal strength indication (RSSI) for the one or more beacons;
an identifier for the first sensor the second sensor or both; or
both.
8. The system of example 1 or any other example in this table, where a border of the zone of the network is determined based on floorplan data for the network.
9. The system of example 9 or any other example in this table, where size of the zone is selected based on one or more walls detailed in the floorplan data.
10. The system of example 1 or any other example in this table, where the group of zone sensors include one or more real-time location service (RTLS) sensors.
11. The system of example 1 or any other example in this table, where the first sensor includes a real-time location service (RTLS) sensor operating in a diagnostic mode.
example
12. The system of example 1 or any other example in this table, where the performance classification routine includes an analytic classification algorithm.
13. A method including:
at a first sensor, broadcasting one or more beacons;
at a second sensor, the first sensor, the second sensor, or both being associated with the zone:
attempting to receive the one or more beacons; and
generating a reception indication of a received portion of the one or more beacons;
at diagnostic circuitry in data communication with the group of zone sensors:
generating, based on the reception indication, a current zone-specific radio signal fingerprint (ZRSF) for the zone; and
applying the current ZRSF to an input for a performance classification routine to compare the current ZRSF to a previous ZRSF for the zone;
determining, via an output of the performance classification routine, that a current performance classification corresponding to the current ZRSF differs from a previous classification for the zone, the previous classification based at least in part on the previous ZRSF for the zone; and
generating, responsive to determining that the current performance classification differs from the previous classification, a performance change indication for the zone, where:
optionally, the method is in accord with any other example in this table.
14. The method of example 13 or any other example in this table, comparing the current ZRSF to the previous ZRSF includes training the performance classification routine using a dataset including the previous ZRSF prior to application of the current ZRSF to the input.
15. The method of example 14 or any other example in this table, further including initializing the training of the performance classification routine based on floorplan data for the network.

TABLE 1-continued

Examples

16. The method of example 15 or any other example in this table, further including causing, at a control interface, presentation of an interface option to add a record of a new sensor to the floorplan data for the network responsive to determining that the current ZRSF differs from the previous classification for the zone.
17. The method of example 13 or any other example in this table, where the current ZRSF includes:
    a received signal strength indication (RSSI) for the one or more beacons;
    an identifier for the first sensor, the second sensor, or both; or
    both.
18. Non-transitory machine-readable media configured to store instructions, the instructions configured to, when executed, cause a machine to:
    at a first sensor, broadcast one or more beacons;
    at a second sensor, the first sensor, the second sensor, or both being associated with a zone:
    attempt to receive the one or more beacons; and
    generate a reception indication of a received portion of the one or more beacons;
    at diagnostic circuitry in data communication with the group of zone sensors:
    generate a current zone-specific radio signal fingerprint (ZRSF) for the zone; and
    apply the current ZRSF to an input for a performance classification routine to compare the current ZRSF to a previous ZRSF for the zone;
    determine, via an output of the performance classification routine, that a current performance classification corresponding to the current ZRSF differs from a previous classification for the zone, the previous classification based at least in part on the previous ZRSF for the zone; and
    generate, responsive to determining that the current performance classification differs from the previous classification, a performance change indication for the zone, where:
    optionally, the non-transitory machine-readable media is in accord with any other example in this table.
19. The non-transitory machine-readable media of example 18 or any other example in this table, where the group of zone sensors include one or more real-time location service (RTLS) sensors.
20. The non-transitory machine-readable media of example 18 or any other example in this table, where the first sensor includes a real-time location service (RTLS) sensor operating in a diagnostic mode.
21. A system including:
    one or more sensors; and
    circuitry configured to implement any feature or any combination of features described in this table or disclosure.
22. A method including implementing any feature or any combination of features described in this table or disclosure.
23. A method including installing the system of any example in this table.
24. A product including:
    machine-readable media; and
    instructions stored on the machine-readable media, the instructions configured to cause a processor to perform (at least in part) the method of any example in this table, where:
    optionally, the machine-readable media is non-transitory;
    optionally, the machine-readable media is other than a transitory signal; and
    optionally, the instructions are executable.

Headings and/or subheadings used herein are intended only to aid the reader with understanding described implementations. The invention is defined by the claims.

What is claimed is:

1. A system including:

a first sensor configured to broadcast one or more beacons;

a second sensor, the first sensor the second sensor or both being associated with a zone, the second sensor configured to:

attempt to receive the one or more beacons; and generate a reception indication of a received portion of the one or more beacons;

diagnostic circuitry in data communication with the second sensor, the diagnostic circuitry configured to:

generate, based on the reception indication a current zone-specific radio signal fingerprint (ZRSF);

apply the current ZRSF to an input for a performance classification routine to compare the current ZRSF to a previous ZRSF for the zone;

determine, via an output of the performance classification routine, that a current performance classification corresponding to the current ZRSF differs from a previous classification for the zone, the previous classification based at least in part on the previous ZRSF for the zone; and generate, responsive to determining that the current performance classification differs from the previous classification, a performance change indication for the zone.

2. The system of claim 1, where the performance classification routine includes:
a neural network;
a support vector machine;
a decision tree;
a k-nearest neighbor algorithm; or
any grouping of the foregoing.

3. The system of claim 1, where the input of the performance classification routine includes an input layer of a neural network.

4. The system of claim 1, where the diagnostic circuitry is configured to compare the current ZRSF to the previous ZRSF by training the performance classification routine using a dataset including the previous ZRSF prior to application of the current ZRSF to the input.

5. The system of claim 4, where the diagnostic circuitry is configured to initialize the training of the performance classification routine based on floorplan data for a network of the sensors.

6. The system of claim 5, where the diagnostic circuitry is further configured to cause, at a user interface for control the diagnostic circuitry, presentation of an interface option to add a record of a new sensor to the floorplan data for the network of the sensors responsive to determining that the current ZRSF differs from the previous classification for the zone.

7. The system of claim 1, where the current ZRSF includes:
a received signal strength indication (RSSI) for the one or more beacons;
an identifier for the first sensor the second sensor or both; or
both.

8. The system of claim 1, where a border of the zone is determined based on floorplan data for the network.

9. The system of claim 1, where size of the zone is selected based on one or more walls detailed in the floorplan data.

10. The system of claim 1, where the second sensor includes a real-time location service (RTLS) sensor.

11. The system of claim 1, where the first sensor includes a real-time location service (RTLS) sensor operating in a diagnostic mode.

12. The system of claim 1, where the performance classification routine includes an analytic classification algorithm.

13. A method including:
at a first sensor, broadcasting one or more beacons;
at a second sensor, the first sensor, the second sensor, or both being associated with the zone:
attempting to receive the one or more beacons; and
generating a reception indication of a received portion of the one or more beacons;
at diagnostic circuitry in data communication with the group of zone sensors:
generating, based on the reception indication, a current zone-specific radio signal fingerprint (ZRSF) for the zone; and
applying the current ZRSF to an input for a performance classification routine to compare the current ZRSF to a previous ZRSF for the zone;
determining, via an output of the performance classification routine, that a current performance classification corresponding to the current ZRSF differs from a previous classification for the zone, the previous classification based at least in part on the previous ZRSF for the zone; and
generating, responsive to determining that the current performance classification differs from the previous classification, a performance change indication for the zone.

14. The method of claim 13, comparing the current ZRSF to the previous ZRSF includes training the performance classification routine using a dataset including the previous ZRSF prior to application of the current ZRSF to the input.

15. The method of claim 14, further including initializing the training of the performance classification routine based on floorplan data for a network of the sensors.

16. The method of claim 15, further including causing, at a control interface, presentation of an interface option to add a record of a new sensor to the floorplan data for the network of the sensors responsive to determining that the current ZRSF differs from the previous classification for the zone.

17. The method of claim 13, where the current ZRSF includes:
a received signal strength indication (RSSI) for the one or more beacons;
an identifier for the first sensor, the second sensor, or both; or
both.

18. Non-transitory machine-readable media configured to store instructions, the instructions configured to, when executed, cause a machine to:
at a first sensor, broadcast one or more beacons;
at a second sensor, the first sensor, the second sensor, or both being associated with a zone:
attempt to receive the one or more beacons; and
generate a reception indication of a received portion of the one or more beacons;
at diagnostic circuitry in data communication with the group of zone sensors:
generate a current zone-specific radio signal fingerprint (ZRSF) for the zone; and
apply the current ZRSF to an input for a performance classification routine to compare the current ZRSF to a previous ZRSF for the zone;
determine, via an output of the performance classification routine, that a current performance classification corresponding to the current ZRSF differs from a previous classification for the zone, the previous classification based at least in part on the previous ZRSF for the zone; and
generate, responsive to determining that the current performance classification differs from the previous classification, a performance change indication for the zone.

19. The non-transitory machine-readable media of claim 18, where the second sensor includes a real-time location service (RTLS) sensor.

20. The non-transitory machine-readable media of claim 18, where the first sensor includes a real-time location service (RTLS) sensor operating in a diagnostic mode.

* * * * *